(12) United States Patent
Uematsu et al.

(10) Patent No.: US 6,315,518 B1
(45) Date of Patent: Nov. 13, 2001

(54) STATIONARY BLADE OF GAS TURBINE

(75) Inventors: Kazuo Uematsu; Kiyoshi Suenaga, both of Takasago (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/230,751
(22) PCT Filed: Jan. 20, 1998
(86) PCT No.: PCT/JP98/00184
§ 371 Date: Feb. 1, 1999
§ 102(e) Date: Feb. 1, 1999
(87) PCT Pub. No.: WO99/36675
PCT Pub. Date: Jul. 22, 1999

(51) Int. Cl.[7] .................................................. F01D 5/18
(52) U.S. Cl. ................................................................ 415/115
(58) Field of Search .................................. 415/115, 114, 415/116; 416/95, 96 R, 96 A, 97 R

(56) References Cited

U.S. PATENT DOCUMENTS

| 5,120,192 | * | 6/1992 | Ohtomo et al. ................. 415/115 |
| 5,320,483 | | 6/1994 | Cunha et al. . |
| 5,340,274 | | 8/1994 | Cunha . |
| 5,399,065 | | 3/1995 | Kudo et al. . |
| 5,829,245 | * | 11/1998 | McQuiggan et al. ............ 415/114 |
| 5,954,475 | * | 9/1999 | Matsuura et al. ............... 415/114 |

FOREIGN PATENT DOCUMENTS

| 60-14203 | 1/1985 | (JP) . |
| 02241902 | 9/1990 | (JP) . |
| 06081675 | 3/1994 | (JP) . |
| 08165902 | 6/1996 | (JP) . |
| 09189203 | 7/1997 | (JP) . |
| 09264103 | 10/1997 | (JP) . |
| 09280002 | 10/1997 | (JP) . |
| 10-37704 | 2/1998 | (JP) . |

* cited by examiner

Primary Examiner—John E. Ryznic
(74) Attorney, Agent, or Firm—Alston & Bird LLP

(57) ABSTRACT

In a stationary blade of a gas turbine, the pressure resisting strength can be decreased by using low-pressure cooling air, and effective cooling can be performed by means of a simple construction. An inside shroud 1 and an outside shroud 2 are cooled by cooling air passing through an impingement plate. A trailing edge portion of a blade portion 6, which is thin in shape, is cooled by cooling air flowing in an air passage 10. Part of this air is discharged through a hole 12 on the side of the inside shroud 1 as inside seal air for a combustion gas passage.

6 Claims, 2 Drawing Sheets

STATIONARY BLADE OF GAS TURBINE

TECHNICAL FIELD

The present invention relates to a stationary blade of a gas turbine, in which cooling can be performed effectively by means of a simple construction.

BACKGROUND ART

A hot section of a turbine blade of a gas turbine has conventionally been cooled by the discharged air or bleed air of a compressor, but it is contrived to cool a stationary blade of a gas turbine by using steam in place of air as one means for improving the gas turbine efficiency.

In the steam cooling of the stationary blade of gas turbine, the extraction steam of a steam turbine which constitutes a combined cycle in combination with the gas turbine is used, so that the steam pressure is usually high. Also, the leakage of steam in the gas turbine must be minimized for the reason of the steam-side cycle. Therefore, in the steam cooling of the stationary blade of gas turbine, the stationary blade is required (1) to have a pressure resisting strength that withstand the steam pressure,
(2) to have a steam passage open to the outside and to have a supply port and a recovery port,
(3) to have a low thermal stress, and
(4) to be easy in manufacturing.

In the conventional stationary blade of gas turbine, as indicated by arrows in FIGS. 3 and 4, cooling steam enters the stationary blade of gas turbine through a cooling steam inlet 32 of an outside shroud 31, and after passing through an impingement plate 39, it goes through an inward cooling passage 34 provided in a blade portion 33, and is turned at an inside shroud 35. After that, the cooling steam passes through an outward cooling passage 36 provided in the blade portion 33, and is recovered at a cooling steam outlet 37.

Besides the aforementioned stationary blade of gas turbine, a stationary blade in which only the inside shroud is air-cooled has been proposed as disclosed in Japanese Patent Application No. 8-749 filed by the applicant of this invention. In Japanese Patent Application No. 8-749, as shown in FIG. 3, in addition to the aforementioned configuration, cooling air is introduced into the inside shroud 35 through a cooling air inlet 40. The cooling air is allowed to flow through the impingement plate 39 to cool the inside shroud 35. After cooling, the air is allowed to flow into a main gas flow F through a film cooling hole 38 provided in the inside shroud 35 to perform film cooling.

The present steam-cooled stationary blade of gas turbine is in the above-described state and certainly advantageous in terms of efficiency. However, its closed, long, and bent passage is complicated in construction, so that it is difficult to manufacture. In addition to this, if the wall thickness is increased to increase the pressure resisting strength, the whole blade becomes rigid, which poses a problem of disadvantage in terms of thermal stress.

The present invention was made to solve the above problems.

DISCLOSURE OF THE INVENTION

For the stationary blade of a gas turbine in accordance with the present invention, the following means were provided:

(1) An inside shroud and an outside shroud are air-cooled.
(2) A trailing edge portion of a blade portion, which is thin in shape, is air-cooled.
(3) In the present invention described in item (2), part of air which has cooled the trailing edge portion of the blade portion is discharged from the side of an inside shroud as inside seal air for a combustion gas passage.

In the aforementioned invention (1), the inside shroud and the outside shroud of the stationary blade of gas turbine is air-cooled, so that the construction can be simplified, and the occurrence of a local uncooled portion and resultant seizure can be prevented.

In the aforementioned invention (2), the trailing edge portion of the stationary blade of gas turbine, which is thin in shape for the aerodynamic reason, is air-cooled, so that this stationary blade is advantageous in terms of strength as compared with the case where high-pressure steam is used for cooling, and pin fin cooling can be performed.

In the aforementioned invention (3), part of air which has cooled the trailing edge portion of the blade portion is discharged from the side of an inside shroud in the aforementioned invention (2), so that the inside seal air for the combustion gas passage can be secured easily without making the construction complicated.

BEST MODE FOR CARRYING OUT THE INVENTION

Figure 1:
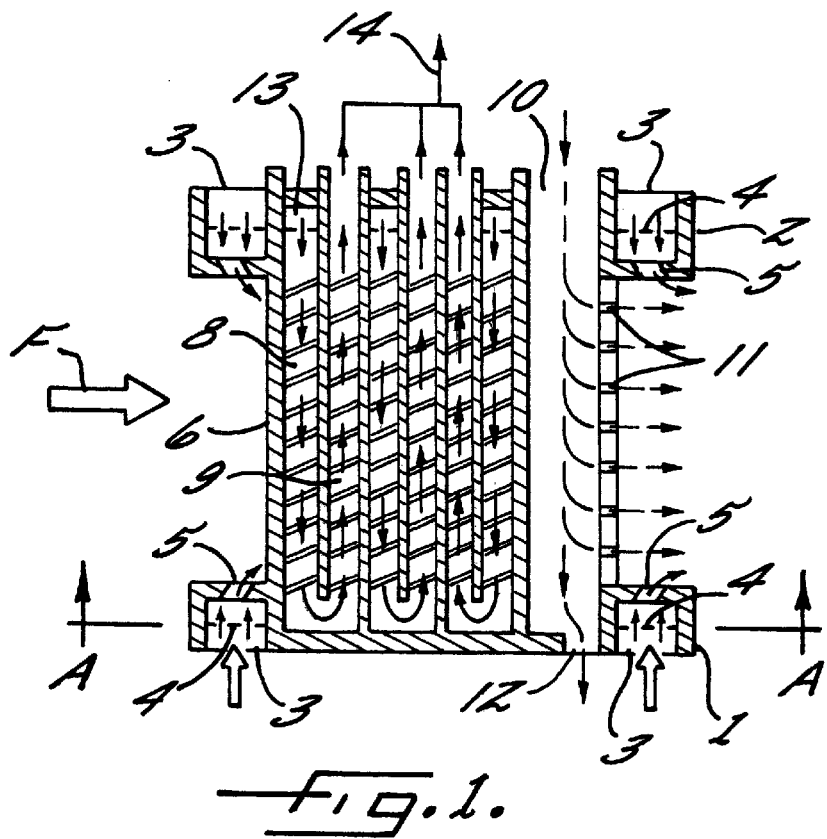
FIG. 1 is a sectional view showing one embodiment of the present invention.
Figure 2:
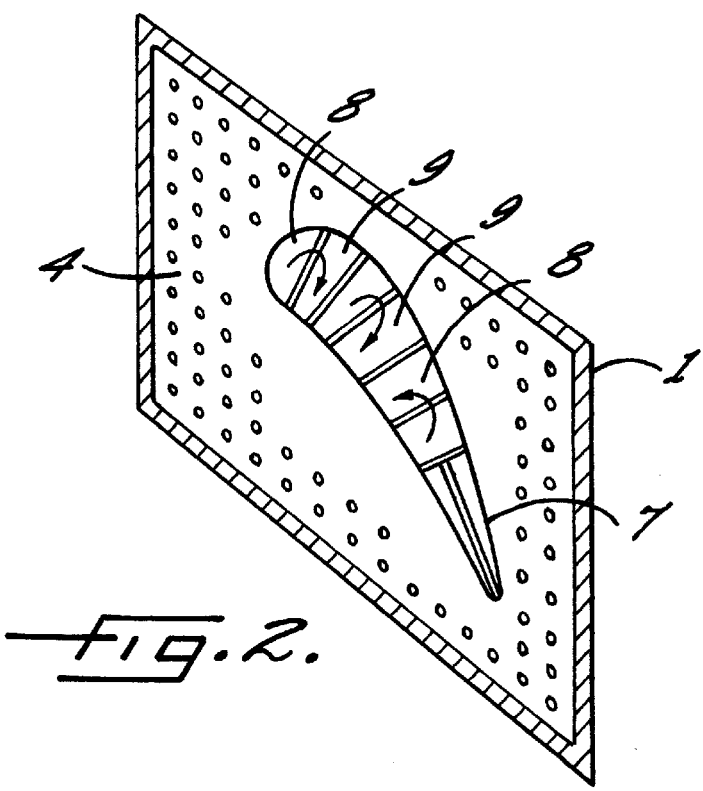
FIG. 2 is a sectional view taken along the line A—A of FIG. 1.
Figure 3:
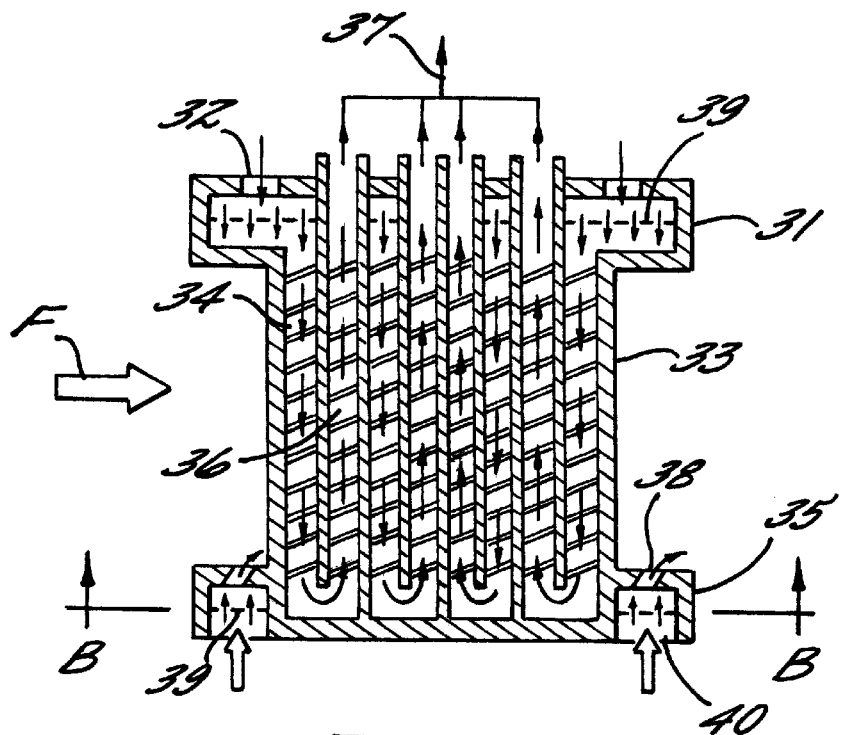
FIG. 3 is a sectional view of a conventional steam-cooled stationary blade of a gas turbine.
Figure 4:
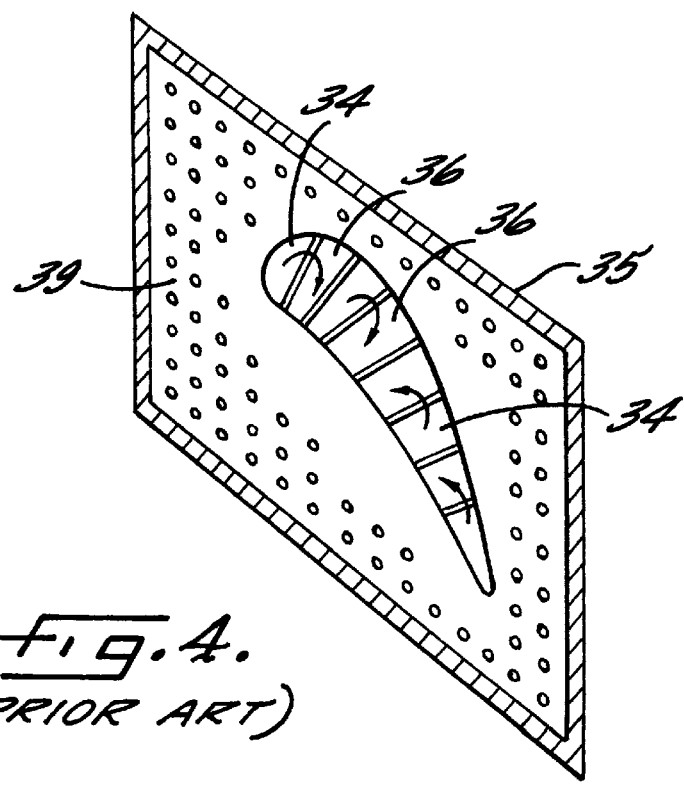
FIG. 4 is a sectional view taken along the line B—B of FIG. 3.

One embodiment of the present invention will be described with reference to FIGS. 1 and 2. In this embodiment, like the conventional stationary blade shown in FIGS. 3 and 4, cooling steam enters an inward cooling passage 8 provided in a blade portion 6 through a cooling steam inlet 13 on the side of an outside shroud 2, and after passing through the passage 8, it is turned on the side of an inside shroud 1. After that, the cooling steam passes through an outward cooling passage 9 provided in the blade portion 6, and is recovered at a cooling steam outlet 14. However, unlike the stationary blade shown in FIGS. 4 and 5, the cooling steam is not supplied into the outside shroud, but is directly supplied to the inward cooling passage 8 of the blade portion 6, and is discharged from the outward cooling passage 9 to the cooling steam outlet 14.

The inside shroud 1 and the outside shroud 2 of the stationary blade of gas turbine are provided with a cooling air inlet hole 3 to perform air cooling. On the opposite side of the cooling air inlet hole 3, a cooling air outlet hole 5 is provided via an impingement plate 4 having many small-diameter through holes.

Also, at the trailing edge portion 7 of the blade portion 6, which is thin in shape for the aerodynamic reason, one air passage 10 provided with pin fins is formed at the portion corresponding to a set of the inward cooling passage 8 and the outward cooling passage 9 to air-cool the trailing edge portion 7. In this air passage 10, cooling air flows from the side of the outside shroud 2 to the side of the inside shroud 1 as indicated by the arrow.

Many holes 11 are formed on the side of the trailing edge of the air passage 10, so that, as indicated by the arrows, the cooling air flowing in the air passage 10 joins with a main gas flow F discharged through a hole 11. Also, a hole 12 is formed in the blade height direction on the side of the inside shroud 1 of the air passage 10. This hole 12 serves as a supply port for discharging part of cooling air flowing in the air passage 10 as inside seal air for the combustion gas passage.

In this embodiment configured as described above, portions other than the trailing edge portion 7 of the blade portion 6 are cooled by the cooling steam flowing in the inward cooling passage 8 and the outward cooling passage 9.

Also, the inside shroud 1 and the outside shroud 2 are cooled by the cooling air flowing into the shroud through the cooling air inlet hole 3 and discharged through the cooling air outlet hole 5, so that the construction can be simplified, and the occurrence of a local uncooled portion and resultant seizure can be prevented. Further, the cooling air supplied into the inside shroud 1 and the outside shroud 2 passes through the impingement plate 4 and is discharged to the surface side of the blade portion 6 through the cooling air outlet hole 5 to film-cool the surface of the blade portion 6, so that the cooling air can be utilized effectively.

Still further, since the trailing edge portion 7 of the blade portion 6, which is thin in shape for the aerodynamic reason, is cooled by the air flowing in the air passage 10, this embodiment is advantageous in terms of strength as compared with the case where high-pressure steam is used. In this embodiment, the cross-sectional area of the air passage 10 can be increased, and the wall thickness of the trailing edge portion 7 of the blade portion 6 can be decreased, so that cooling can be performed effectively, and pin fin cooling can be performed.

The cooling air which has cooled the trailing edge portion 7 of the blade portion 6 is discharged through the plural holes 11 formed on the blade edge side of the trailing edge portion 7 of the blade portion 6 and joins with the main gas flow F, and part of the cooling air is discharged inward through the hole 12 on the side of the inside shroud of the air passage 10, serving as inside seal air for the combustion gas passage, so that the inside seal air can be secured easily.

INDUSTRIAL APPLICABILITY

According to the stationary blade of gas turbine in accordance with the present invention, the problems of complexity of construction and difficulty in manufacture, which the conventional steam-cooled stationary blade has, can be solved by the air cooling of a part of the stationary blade, and also the seal air on the inside of the combustion gas passage can be secured easily. Also, the stationary blade of the present invention is advantageous in terms of strength, and can withstand a thermal stress. Therefore, the reliability of gas turbine can further be enhanced.

What is claimed is:

1. A stationary blade of a gas turbine, comprising a blade portion fixed at outer and inner ends thereof to an outside shroud and an inside shroud, respectively, the blade portion having a steam cooling passage formed in an interior thereof for steam-cooling of a part of the blade portion, and a cooling steam inlet connected to the steam cooling passage for supplying cooling steam directly thereinto, a trailing edge portion of the blade portion having a cooling air passage formed therein, and a cooling air inlet connected to the air cooling passage for supplying cooling air directly thereinto such that the trailing edge portion is air-cooled, the inside shroud and outside shroud each defining a cooling air inlet through which shroud cooling air is supplied separately from the cooling air supplied for cooling the trailing edge portion of the blade portion.

2. A stationary blade of a gas turbine according to claim 1, wherein part of the air which has cooled the trailing edge portion of the blade portion is discharged from the inner end of the blade portion through a side of the inside shroud as inside seal air for a combustion gas passage.

3. A stationary blade of a gas turbine according to claim 1, wherein the cooling air inlet of each of the shrouds includes an impingement plate having a plurality of holes arranged for impingement cooling the shrouds.

4. A stationary blade of a gas turbine according to claim 1, wherein the steam cooling inlet is connected to the outer end of the blade portion, and further comprising a steam cooling outlet connected to the outer end of the blade portion for recovering the cooling steam after cooling of the blade portion.

5. A stationary blade of a gas turbine according to claim 1, wherein the trailing edge portion of the blade portion includes holes for discharging at least a portion of the cooling air that has cooled the trailing edge portion into a main gas flow path so as to film cool the trailing edge portion.

6. A stationary blade of a gas turbine, comprising a blade portion fixed at outer and inner ends thereof to an outside shroud and an inside shroud, respectively, the blade portion having a steam cooling passage formed in an interior thereof for steam-cooling of the blade portion, and a cooling steam inlet connected to the steam cooling passage for supplying cooling steam directly thereinto, the inside shroud and outside shroud each defining a cooling air inlet through which cooling air is supplied such that the inside shroud and outside shroud are air-cooled, wherein each of the shrouds includes a cooling air outlet hole configured to discharge cooling air over an exterior surface of the blade portion for film cooling the blade portion.

* * * * *